United States Patent [19]

Kaehler

[11] 4,305,454
[45] Dec. 15, 1981

[54] HEAT EXCHANGER WITH RECIRCULATION

[75] Inventor: Dieter Kaehler, Berlin, Fed. Rep. of Germany

[73] Assignee: Alfa-Laval Agrar GmbH, Hamburg, Fed. Rep. of Germany

[21] Appl. No.: 105,769

[22] Filed: Dec. 20, 1979

[30] Foreign Application Priority Data

Dec. 20, 1978 [DE] Fed. Rep. of Germany ....... 2854999

[51] Int. Cl.³ ............................................. F28F 13/06
[52] U.S. Cl. .................................... 165/108; 219/314; 219/321
[58] Field of Search ................ 165/108, 132; 219/312, 219/314, 316, 320, 321

[56] References Cited

U.S. PATENT DOCUMENTS

| | | | |
|---|---|---|---|
| 3,251,401 | 5/1966 | Gardner, Jr. | 165/108 |
| 3,448,792 | 6/1969 | Lawrence | 165/108 |
| 3,517,732 | 6/1970 | Brebant | 165/108 |
| 3,759,318 | 9/1973 | Putney et al. | 165/108 |

FOREIGN PATENT DOCUMENTS

542906 3/1956 Italy .................................. 165/108

*Primary Examiner*—Sheldon J. Richter
*Attorney, Agent, or Firm*—Peter K. Kontler

[57] ABSTRACT

A heat exchanger wherein an upright insulated outer jacket contains a body of relatively cold liquid and spacedly surrounds an upright hollow cylindrical heat conducting body which, in turn, spacedly surrounds a helical heating body confining a flowing heating medium. The upper and lower ends of the heat conducting body are open so that cold liquid can enter the heat conducting body from below to exchange heat with the medium in the helical heating body, to thereby rise in the heat conducting body, and to issue at the upper end of the heat conducting body. The upper end of the heat conducting body has a flow restrictor which defines an outlet opening for the heated liquid. An electric heater can be installed in the outer jacket to heat the liquid when the supply of warmer medium is insufficient.

2 Claims, 2 Drawing Figures

HEAT EXCHANGER WITH RECIRCULATION

BACKGROUND OF THE INVENTION

The invention relates to a heat exchanger for transferring the heat contents of a warm medium to a liquid to be heated, with a substantially upright insulated outer jacket and a heat conducting body that guides the flow of the cooling liquid and that extends in the interior of an inner space surrounded by the outer jacket.

Heat exchangers of this type serve particularly for the reclaiming of heat from heated cooling media, from waste water and from naturally warm media. Their heat contents could have been heretofore utilized only with difficulty. Attempts at the reclaiming of this heat have been only very reluctantly realized in practice, inasmuch as the investment expenditures were very high in comparison to the reclaimed heat. In view of the relatively small temperature gradient, it was necessary, as a rule, to operate with large heating surfaces. Recently, the considerations for the construction of heat exchangers which are suited for these purposes have again gained in importance in view of the rising costs of energy and increasing demands for environmental protection.

OBJECTS AND SUMMARY OF THE INVENTION

Consequently, it is an object of the present invention to so improve the heat exchanger of the initially mentioned type that good efficiency is obtained at a small temperature difference and at relatively small throughput amounts of the warmer medium, with simple construction.

This objective is achieved in accordance with the invention in that the heat conducting body surrounds a heating body traversed by the warmer medium and is configured as a separating wall that separates the liquid to be heated which warms up at the heating body from the remaining contents of the inner space and that is provided, in the sense of the liquid to be heated which rises therein based on its warming-up, with an inlet opening at its lower end and an outlet opening at its upper end.

With the aid of the heat conducting body, a relatively small proportion is delimited from the total volume of the liquid to be heated and is brought into immediate contact with the heating body. Consequently, this proportion of the liquid which is surrounded by the heat conducting body is intensely heated at the heating body, inasmuch as its mixing with the remainder of the liquid to be heated is prevented by the heat conducting body. As a result of the heating, the liquid to be heated rises upwardly so that a colder liquid can enter from below into the heat conducting cylinder. In this manner, a flow is created in the heat conducting body which results in that the warmed-up liquid emerges out of the upper part of the heat conducting body and becomes layered on the cooler fluid which is present in the lower part of the heat exchanger. The temperature of the warmer liquid renders it possible to economically utilize the same. It is withdrawn from the upper part of the heat exchanger without being able to mix with the cold liquid that is fed into the lower part of the container, in view of the relatively exactly configured separating layer.

According to a preferred embodiment of the invention, the outlet opening is configured as a trottling location. It is prevented by it that a natural flow in the heat conducting body could occur with such vigor that the outlet temperature at the outlet opening would not be high enough for the purposes of use. By the selection of the trottling openings, the flow in the heat conducting body can be so determined that the temperature at the outlet opening can be considerably determined in the framework of the thermodynamic possibilities of heat exchange.

Further details of the invention will become apparent from the following detailed description and the accompanying drawings, in which there is exemplarily illustrated a preferred embodiment of the invention.

DESCRIPTION OF THE PREFERRED EMBODIMENTS

Figure 1:
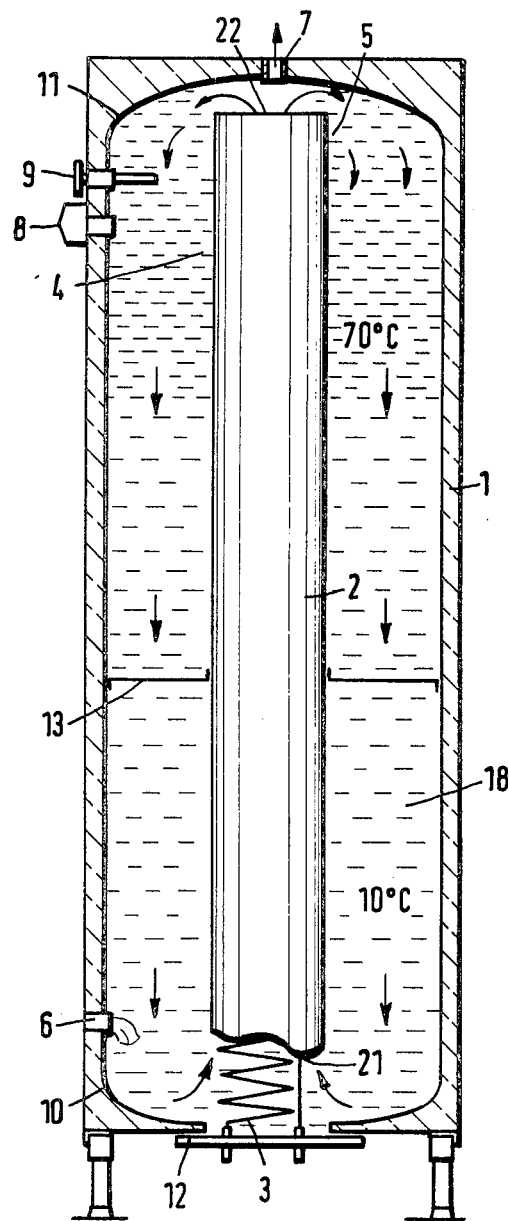
FIG. 1 is a longitudinal section through a heat exchanger with a heat conducting body that is open at its upper part and FIG. 2 is a longitudinal section through a heat exchanger with a riser tube which closes the heat conducting body at the top.
Figure 2:
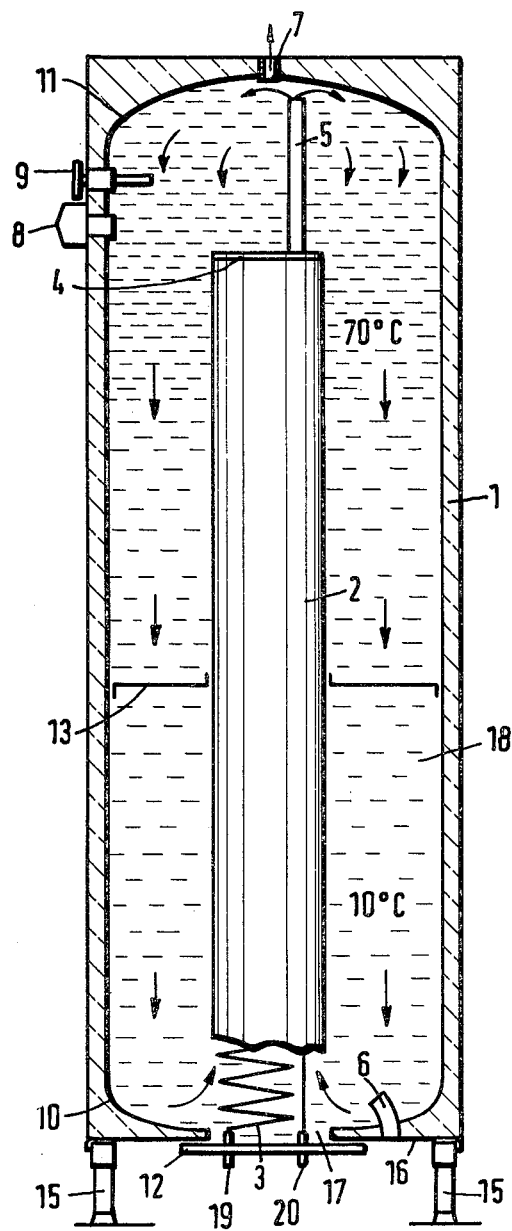

A heat exchanger consists essentially of an outer jacket 1, a heat conducting body 2, and a heating body 3 which is constructed as a heat exchanger. The outer jacket 1 extends, with its longitudinal axis, substantially upright, on legs 15 which are connected to a lower outer bottom 16 of the outer jacket 1. In the lower bottom 16, there is provided an opening 17 the cross section of which is so dimensioned that the heat conducting body 2 with the heating body 3 can be introduced through the opening 17 into the interior 18 of the outer jacket 1. This opening 17 is fluidtightly closed by a bottom plate 12. The heating body 3 is connected to the bottom plate 12 so that the inlet 20 and the outlet 19 for the warm medium which flows through the heating body extend through the bottom plate 12. The heating body 3 is constructed as a helix the diameter of which approximately corresponds the inner diameter of the heat conducting body 2 which is configured as a cylinder. Herein, the heating body 3 is so designed as to its dimensions that the convolutions do not touch the inner surface of the heat conducting body 2. In this manner, flow can still form in the liquid which fills the heat conducting body 2 between the helix and the inner surface of the heat conducting body 2.

In the lower part of the outer jacket 1, there is provided an inflow opening 6 for cold liquid. It is located immediately upwardly of the rounding of the inner bottom 10, but it can also be provided in the lower part of the bottom 2 immediately next to the bottom plate 12. Inasmuch as the liquid to be heated should enter the inflow opening 21 of the heat conducting body 2 from all sides of the cross section, the concentric arrangement of the heat conducting body 2 relative to the outer jacket 1 offers itself.

The heat conducting body 2 is provided, at its upper end, with an exit opening 22 out of which the warmed-up liquid can emerge in a direction to the interior of the outer jacket 1. When the flow distribution within the heat conducting body 2 is uniform, the warmed-up liquid enters the interior 18 to all sides and becomes layered on the cold liquid which is present in the lower part of the outer jacket 1. At the highest point of a domeshaped upper bottom 11, there is provided an outflow opening 7 through which the warm liquid can be withdrawn from the interior 18. A thermometer 9 indicates the temperature of the warm liquid.

The heating medium, for instance, the heated-up cooling fluid of a circulation circuit which is not shown in detail, is introduced into the helix of the heating body 3 at the inlet 20 and conducted away again at the outlet 19. It flows through the helix and, in connection therewith, transmits its heat contents to the liquid to be heated which surrounds the heating body 3 within the heat-conducting body 2. Based on its warming up, the liquid present in the interior of the heat conducting body 2 rises in the heat-conducting body 2 and forms a natural flow which extends in the direction to the upper bottom 11. Herein, the liquid which has been already pre-heated at the lower part of the heating body 3 flows, at the upper part, through further convolutions of the heating body helix 3 so that it is progressively heated in correspondence with the heat made available by the warm medium and in dependence on the respective temperature level, with long dwell in the heat conducting body 2. The liquid which has been warmed up in this manner exits at the opening 22 from the heat conducting body 2 and is discharged at all sides onto the cold liquid which is present in the lower part of the interior 18, so that the warmed-up liquid becomes layered on the cold liquid. Depending on the demand, the warmed-up liquid can be withdrawn from the outflow opening 7. The temperature is indicated by the thermometer 9.

A controlling possibility for the temperature of a liquid to be heated is achieved with the aid of a throttling location 5. This is formed at the exit opening 22 of the heat conducting body 2, in that the latter is closed by a plate 4 except for the desired throttling location 5. By the proper selection of the throttling location 5, the warm liquid is hindered in its emergence from the heat conducting body 2 until it has reached the desired temperature. For the event that varying temperatures are to be made available at the outflow opening 7 of the heat exchanger, it is possible to so construct the throttling location 5 as to be variable.

Advantageously, the throttling location 5 can be moreover constructed as riser tube, which enhances the uniform distribution of the liquid to be heated. This riser tube can moreover be arranged eccentrically with respect to the cylindrical heat conducting body 2 in order to prevent, in this manner, the possibility that the liquid which rises through the riser tube and which is being heated would be directly evacuated through the outflow opening 7.

The heat conducting body 2 can be held in the interior 18 of the outer jacket 1 with the aid of supporting braces 13. These supporting braces 13 are so constructed that they present as small an obstruction as possible to the liquid flow which forms in the interior of the heat exchanger. They serve as transportation security in order to prevent bending of the heating body 3 and of the heat conducting body during the transportation.

In addition to the mounting of the heating body 3 on the bottom plate 12, it is advantageous to also support the same in the interior of the heat conducting body 2 with respect to the latter. In this manner, the helix is so secured in the heat conducting body 2 that it cannot suffer any damage even during transport of the heat exchanger.

It is very important that the heat conducting body 2 be so small with respect to its volume that the heating body just fits into the same. In this manner, the volume of the heat conducting body 2 is maintained small so that the liquid which is present there and which is to be warmed up can be rapidly heated. As a result of this, there is created a vigorous upward flow which results in an advantageous heat exchange at the heating body 3. Should the medium provided for the heating of the liquid be unavailable in sufficient amounts or at the desired temperature, a pump can be provided to enhance the flow which develops in the heat conducting body 2, which pump takes care of the necessary circulation speed and thus contributes to improved heat transfer. In addition, it is possible to provide an electric heating device 8 in the interior 18 of the heat exchanger. This is switched on for the support of the entire system when an insufficient amount of heat is made available by the medium to be cooled. With its aid, it is possible, in an economical manner, to always have constant supply of heat available at the upper part of the heat exchanger.

The heat conducting body 2 can consist of metallic or other materials. When the materials are metallic, heat transfer along the heat conducting body 2 to the cooling liquid present outwardly of the heat conducting body 2 has to be taken into account. In contradistinction, other materials, such as synthetic plastic materials and ceramic materials, act insulatingly, so that a good warming-up of the liquid to be heated within the heat conducting body 2 can be anticipated even at a small temperature difference. Especially in these cases, it is important to so keep the heat contents within the heat conducting body 2 that natural flow of the liquid which is being heated can form within the heat conducting body 2. For this reason, it is proposed in these cases to make the heat conducting body 2 of materials which constitute poor heat conductors.

The function of the heat exchanger according to the invention is independent of the constructional arrangement of the bottom plate 12. The heat conducting body 2 with the heating body 3 extending in the same can now be also introduced into the outer jacket 1 in a different manner. For instance, it is to be contemplated that the heat conducting body 2 and the heating body 3 are introduced into outer jacket 1 from above. In this case, there is to be provided in the upper bottom a closing plate with which the heat conducting body 2 as well as the heating body 3 are connected.

I claim:

1. A heat exchanger for transferring heat from a warmer medium to a liquid to be heated, comprising a substantially upright insulated outer jacket defining an internal space containing the liquid to be heated; a hollow heat conducting body disposed in the interior of said jacket and arranged to guide the liquid to be heated; and a heating body traversed by the warmer medium and surrounded by said heat conducting body, said heat conducting body separating the liquid which is heated in the interior thereof as a result of heat exchange with the warmer medium in said heating body from the liquid in the internal space of said jacket and said heat conducting body having a lower end provided with an inlet opening for admission of liquid to be heated from said internal space and an upper end provided with a plate and a flow restrictor disposed on said plate and defining an outlet opening for the liquid which is heated in the interior of and rises in said heat conducting body, said flow restrictor including a riser tube projecting from said plate.

2. The heat exchanger of claim 1, wherein said heat conducting body is a cylinder and said riser tube is eccentric to said cylinder.

* * * * *